United States Patent [19]

Stein

[11] Patent Number: 4,876,912

[45] Date of Patent: Oct. 31, 1989

[54] SWITCHING MECHANISM FOR DRIVING SELF-PROPELLING AGRICULTURAL MACHINES

[75] Inventor: Franz Stein, Harsewinkel, Fed. Rep. of Germany

[73] Assignee: Claas Ohg, Harsewinkel, Fed. Rep. of Germany

[21] Appl. No.: 257,965

[22] Filed: Oct. 13, 1988

[30] Foreign Application Priority Data

Oct. 13, 1987 [DE] Fed. Rep. of Germany ....... 3734554

[51] Int. Cl.⁴ .............................................. G05G 5/06
[52] U.S. Cl. ....................................... 74/535; 74/527; 74/532; 74/577 R
[58] Field of Search ............ 74/532, 527, 535, 577 M, 74/577 S, 575, 540, 526, 475; 292/DIG. 4

[56] References Cited

U.S. PATENT DOCUMENTS

| | | | |
|---|---|---|---|
| 777,745 | 12/1904 | Pavlish | 74/535 |
| 2,485,015 | 10/1949 | Radtke | 74/535 |
| 2,586,356 | 2/1952 | Lewis | 74/532 X |
| 2,593,312 | 4/1952 | Joseph | 74/540 X |
| 2,691,702 | 10/1954 | Allison | 74/527 X |
| 2,708,907 | 5/1955 | Lindeman et al. | 74/527 X |
| 2,722,514 | 11/1955 | Sloan | 74/527 X |
| 2,830,653 | 4/1958 | Gaugler | 74/532 |
| 3,461,741 | 8/1969 | Koland | 74/532 |
| 3,875,822 | 4/1975 | Erith et al. | 74/577 M X |
| 4,117,743 | 10/1978 | Suzuki et al. | 74/577 M |

FOREIGN PATENT DOCUMENTS 1120460  7/1956  France ................................. 74/532

Primary Examiner—Rodney M. Lindsey
Attorney, Agent, or Firm—Michael J. Striker

[57] ABSTRACT

A switching mechanism for driving a self-propelling agricultural machine, particularly a harvester thresher, comprises a switching lever arranged to assume a switching-off position actuated by a spring force and a fixed abutment, and a switching-on position actuated against a spring force, and mechanical means for obtaining a fixed position of the switching lever, the switching lever being arranged so that it is movable both for obtaining the switching-on position and also for unlocking the switching lever from the fixed position in a same direction.

4 Claims, 2 Drawing Sheets

SWITCHING MECHANISM FOR DRIVING SELF-PROPELLING AGRICULTURAL MACHINES

BACKGROUND OF THE INVENTION

The present invention relates to a switching mechanism for driving self-propelling agricultural machines, particularly harvester threshers.

In the machines of the above mentioned type conventionally several drives are used which when needed must be switched on and switched off. A switching mechanism with a switching lever serves this purpose. It is known to use a switching mechanism in which a switching lever moves between a switching-off position actuated by a spring force and a fixed abutment, and moves to a switching-on position against the action of a spring. In the known switching levers which are formed as hand levers, the switching lever supports a gripper which acts upon a pawl through a rod or a pulling element. The pawl cooperates with a stationary adjusting segment or a similar part, whereby the switching lever can be unlocked from the switching-on position. This arrangement is relatively expensive, since it is composed of many individual parts, and moreover is limited to a hand lever since for actuating a gripper a free hand is required.

SUMMARY OF THE INVENTION

Accordingly, it is an object of the present invention to provide a switching mechanism which avoids the disadvantages of the prior art.

More particularly, it is an object of the present invention to provide a switching mechanism in which a switching lever can be actuated easier than in known switching mechanisms, for example also with a foot.

In keeping with these objects and with others which will become apparent hereinafter, one feature of the present invention resides, briefly stated, in a switching mechanism in which a switching lever is moved in a same direction both for reaching the switching-on position, and also for its unlocking.

It is presumed that the switching lever moves over the switching-on position outwardly, which is the case with elastic pulling means drive, but also is possible with other elasticities in the transmission rods.

In accordance with another feature of the present invention, the switching lever has a rotatable two-arm pawl provided with notches at its both ends and formed so that its one notch in respective position of the pawl cooperates with a stationary holding pin, and thereby provides locking of the switching lever in the switching-on position.

A further feature of the present invention is that three immovable controlling pins are provided and arranged so that one notch of the pawl cooperates with a first control pin during running over the turning on position so that the pawl is brought to a position in which the other notch during the release of the switching lever cooperates with a third holding pin so as to provide the locking, and during a next movement of the switching lever over the turning on position outwardly, the one notch cooperates with the second control pin and the pawl is turned so that the pawl during the release of the switching lever cooperates with a lateral edge on the third holding pin and is turned by the latter to an intermediate position.

Still a further feature of the present invention is that a fourth control pin is arranged in the region of the switching-off position so that during movement of the switching lever from the turning on position to a turning off position it comes in contact with a side edge of the pawl and turns the pawl so that during a next turning on movement the one notch of the pawl is in working cooperation with the first control pin in the region of tee turning on position.

Finally, the notches of the pawl can h=formed asymmetrically, and each notch can include two flanks which are arranged at an angle of approximately 90° relative to one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
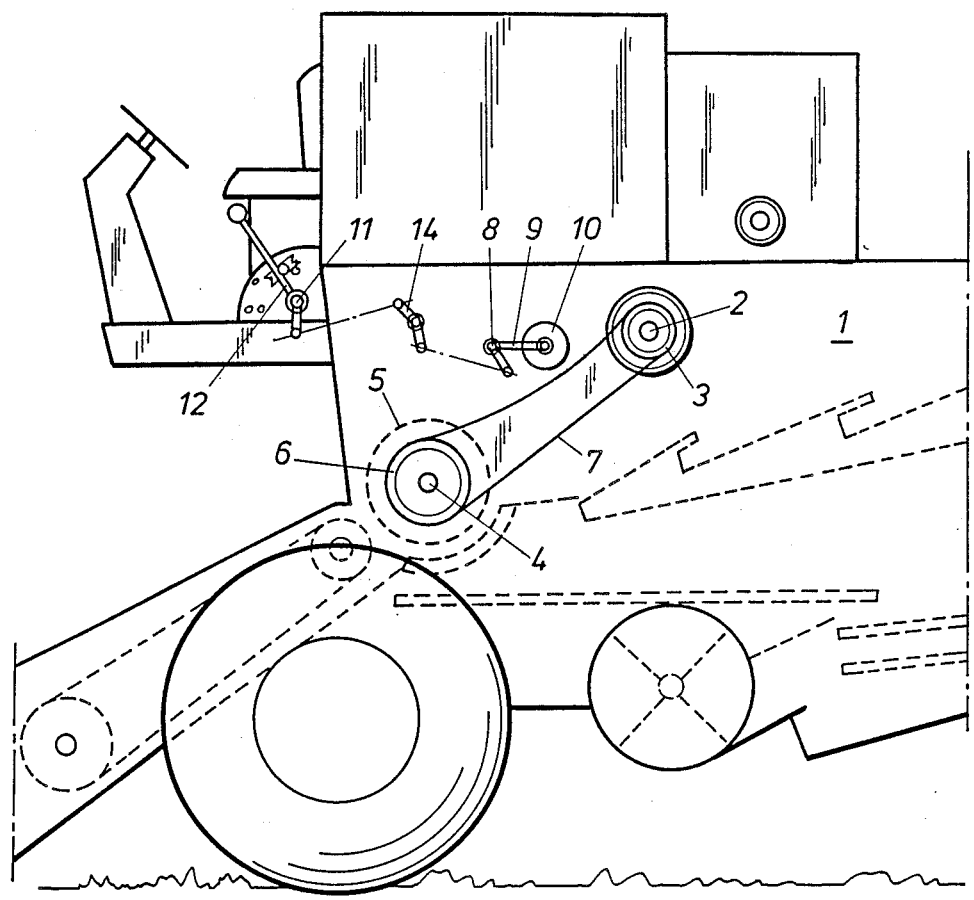
FIG. 1 is a side view which schematically shows a central part of a harvester thresher.

A harvester thresher is identified as a whole with reference numeral 1. It has a drive shaft 2 which is driven from a not shown motor, and a cone belt disc 3 is connected with the driven shaft 2. A threshing drum 5 has a shaft 4 which carries a cone belt disc 6. A cone belt 7 surrounds both cone belt discs 3 and 6 in a loose manner.

A double lever 9 is rotatably supported on a machine-fixed pin 8. Its long leg 9' rotatably supports a tensioning roller 10. The tensioning roller 10 in a position shown in dashed-dot line presses against a rear of the cone belt 7 so that the threshing drum 5 is driven from the drive shaft 2, which is identified as a switching-on position E.

Figure 2:
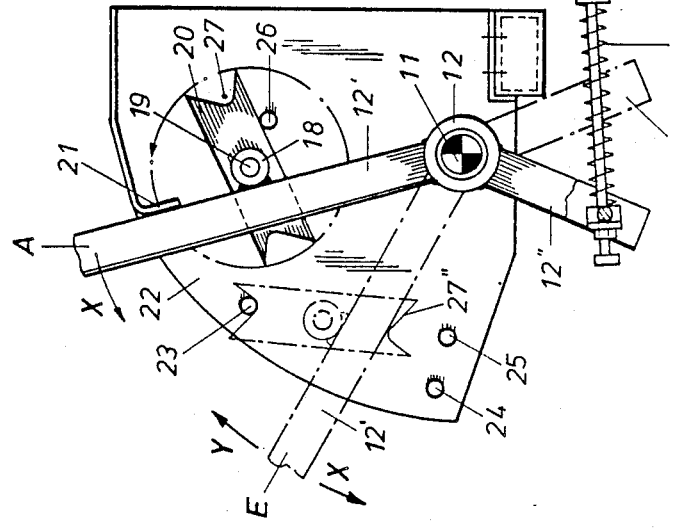
FIG. 2 is a view showing a switching mechanism with a switching lever together with rods and a belt tensioning roller, with the switching lever shown in switching-off position in solid lines and in switching-on position in broken lines.

In the position shown in FIG. 2 in solid lines, the tensioning roller 10 is withdrawn from the cone belt 7. Thereby the drive of the threshing drum 5 is interrupted, which is identified as a switching-off position A.

A double-arm switching lever 12 is rotatably supported on a stationary pin 11. Its longer arm 12' is formed as a hand lever, while its shorter arm 12" is in operative connection with the short leg 9" of the double lever 9 through a rod 13, a double lever 14 and a further rod 15. A pressure spring 16 with one end abutting against a stationary abutment 17 presses the switching lever 12 to the switching-off position A shown in solid lines, so that no other force acts on the switching lever 12.

A bush 18 is welded on the longer arm 12' of the switching lever 12. A pin 19 extends through the bush 18 and is fixedly connected with a pawl 20. Preferably, a not shown small brake is arranged between the bush 18 and the pawl 20 for limiting the free movability of the pawl 20. The longer arm 12' abuts in the switching-off position A against a stationary abutment 21.

A stationary holding pin 23 is mounted on a side wall 22. In the region of the switching-on position E a first control pin 24 and a second control pin 25, and in the region of the switching-off position A a third control pin 26 are provided.

The pawl 20 has notches 27 at its both ends. The notches 27 have flanks 27' and 27" which extend substantially perpendicular to one another and are rounded in a base region. The notches 27 are asymmetrical relative to a central axis of the pawl and are arranged centrally symmetrically relative to one another.

Figure 3:
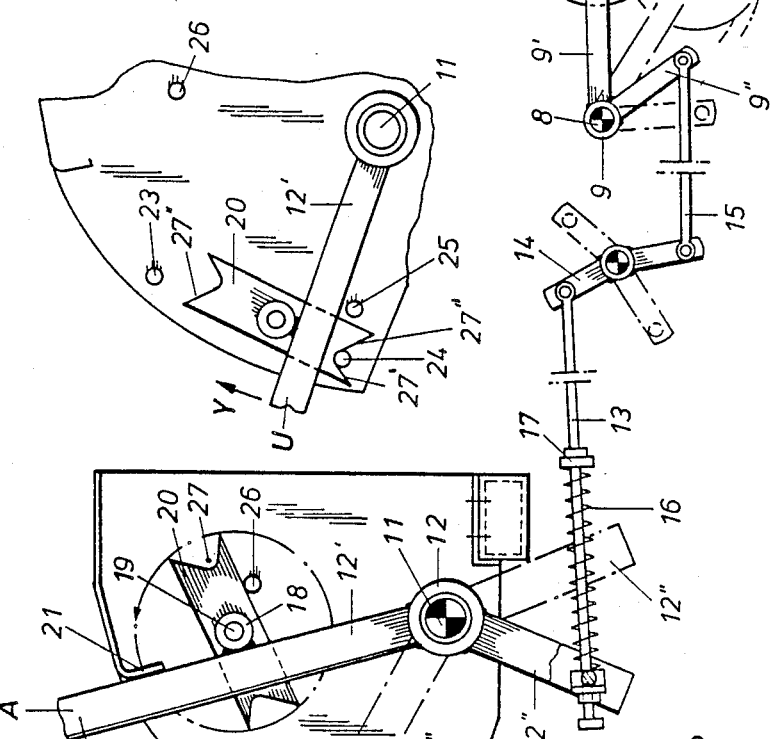
FIG. 3 is a view showing a fragment of FIG. 2 in a changing over position from switching-off toward the switching-on position.

In a switching-off position shown in FIG. 2, the switching lever 12 assumes the position shown in solid lines. The pawl 20 is also in the position shown in solid lines. For turning to the switching-on position, the switching lever 12 is moved in the direction of the arrow X. The switching lever 12 moves over the switching-on position E outwardly. The flank 27" of the notch 27 acts on the first control pin 24. During a further movement the pawl 20 is turned so far that the control pin 24 lies in the rounded space region of the notch 27. This switching lever 12 is then in the position U shown in FIG. 3. When the switching lever 12 is released, it moves under the action of the pressure spring 16 and the tension of the cone belt 7 in direction of the arrow Y. One flank 27" hits in FIG. 3 the holding pin 23, whereby the pawl 20 is turned so far that the holding pin 23 lies in the base region of the notch 27. A further movement in the direction of arrow Y is no longer possible. The switching-on position E in FIG. 2 is assumed and locked.

Figure 4:
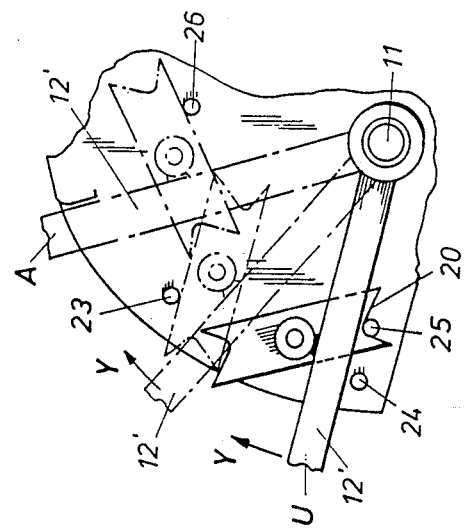
FIG. 4 is a view a showing a fragment of FIG. 2 with a switching lever in two intermediate positions from the switching-on position toward the switching-off position, and in the switching-off position.

When the switching-off position must be again reached, the switching lever 12 must be first unlocked. For this purpose the switching lever 12 is moved in direction of the arrow X until it reaches the position U, in FIG. 4. Thereby the flank 27" hits the second control pin 25 in FIG. 2 and the pawl 20 turns in a position which is shown in FIG. 4 in solid lines. When the switching lever 12 is released, it moves under the action of the pressure spring 16 in direction of the arrow Y. When the switching lever reaches a central position in FIG. 4, the pawl 20 hits with its lateral edge the holding pin 23 and during further movement of the switching lever 12 turns so far until it is in the switching position shown in FIG. 4. Thereby it again reaches the switching-off position A shown in solid lines in FIG. 2.

Because of asymmetrical shape of the notches of the pawl 27 and the selected positioning of the control pins, especially the pin 25, a short switching path is obtained in a highly advantageous manner.

It will be understood that each of the elements described above, or two or more together, may also find a useful application in other types of constructions differing from the types described above.

While the invention has been illustrated and described as embodied in a switching mechanism for driving of a self-propelling agricultural machine, for example a harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A switching mechanism for driving a self-propelling agricultural machine, particularly a harvester thresher, comprising a switching lever supported rotatably around a pivot point against a spring force; a pawl associated with said switching lever and operative for securing the latter in its switching-on position, said pawl being rotatably connected with said switching lever and having two notches spaced by equal distances from said pivot point; four stationary pins associated with said switching lever for controlling a rotary position of said pawl during a manual displacement of said switching lever alternatingly in one of two switching positions; and abutments each associated with a respective one of the switching positions and holding said switching lever by means of the spring force in a selected switching position.

2. A switching mechanism as defined in claim 1, wherein said notches of said pawl are formed as asymmetrical notches.

3. A switching mechanism as defined in claim 2, wherein each of said notches of said pawl has flanks which are arranged at an angle of substantially equal to 90°.

4. A switching mechanism as defined in claim 1, and further comprising a spring which provides said switching force.

* * * * *